3,263,813
FILTRATION APPARATUS
Paul A. Keller, 203 Riverside Drive, Austin, Tex.
Continuation of application Ser. No. 181,351, Mar. 21, 1962. This application Sept. 23, 1965, Ser. No. 495,013
4 Claims. (Cl. 210—232)

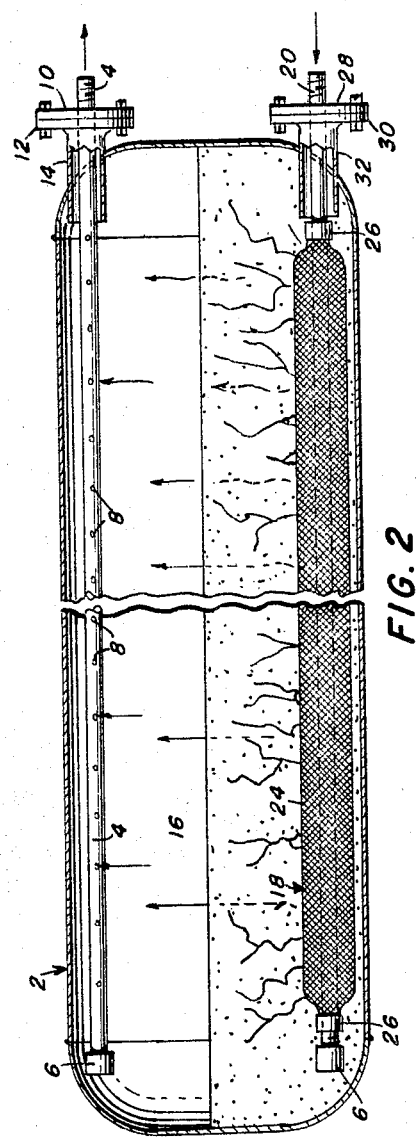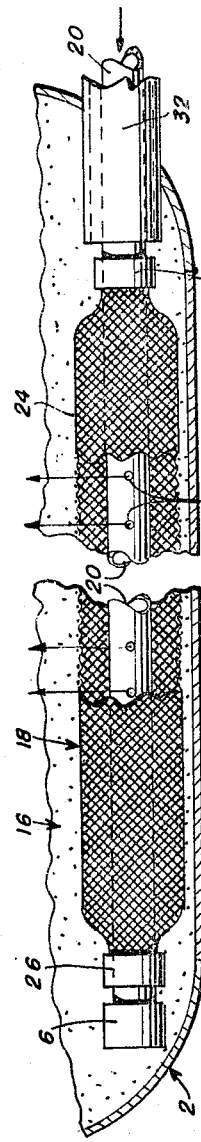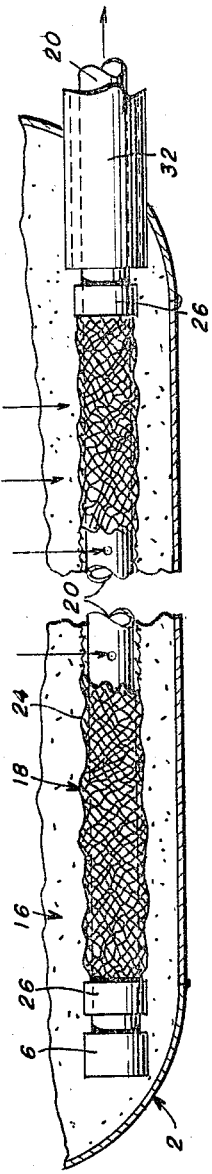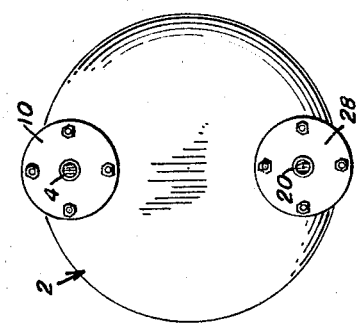
INVENTOR
PAUL A. KELLER
BY Beale and Jones
ATTORNEYS

United States Patent Office 3,263,813
Patented August 2, 1966

This is a continuation of my application Serial No. 181,351, filed March 21, 1962, now abandoned.

This invention relates to an improvement in liquid filtration tanks. More particularly it relates to those liquid filtration tanks which utilize a bed of particulate matter through which a fluid is filtered and in which the filter bed is reactivated, cleaned, or regenerated by the diffusion of a liquid from beneath or within the filter bed.

In part, the invention includes an inflatable flexible sleeve of mesh, fabric, or other foraminous material which surrounds the conduit through which regenerating fluid is admitted. The use of such a sleeve results in advantages which simplify the construction and operation of filtration plants known heretofore, as will be described hereafter.

One object of this invention is to provide a means of effective diffusion of the backwash fluid in the filter bed during regeneration.

Another object is to provide a more efficient system for mechanical agitation of the filter bed during the regenerative cycle.

It is also an object to reduce the size of filter tanks due to the efficiency of my design, which enables the elimination of the graduated sizes of filter supporting beds presently found in filtration plants.

An additional object is to provide a simple means for removing the influent and effluent members which are within said tanks and to thus eliminate the time consuming maintenance associated with such removal in the tanks currently used.

My improved design will also increase the effective filtration surface available in a tank of a given size.

The invention will be more readily understood from a reading of the following specification and reference to the accompanying drawing wherein;

FIGURE 1 is an end view of a filtration tank having only one set of influent and effluent connections;

FIGURE 2 is an elevation view, largely in section, of one form of the improved tank construction, said view illustrating the condition of the tank during the regenerative cycle;

FIGURE 3 is a fragmentary detail view, partly in section, of the effluent element of the tank during the regenerative cycle; and FIGURE 4 is a fragmentary detail view, partly in section, of the effluent member during the normal filtration operation of the tank.

It is a well known principle to filter or chemically treat liquid by passing it through a bed composed of granular or particulate material. Filter beds of this nature may be used to mechanically remove impurities from a liquid or they may react chemically with the liquid, as is done in the well known ion exchange water softeners.

Filtration tanks of this type are generally regenerated by washing the filter bed by forcing a liquid, often chemically active with the filter material, up through the bed to flush the filter medium. Backwash regeneration such as this has resulted in numerous attempts to adequately diffuse the backwash fluid and to agitate the filter bed during regeneration.

A common tank construction now known utilizes a vertically oriented cylindrical tank having a spider of perforated pipes at the bottom thereof and having a perforated diffuser plate directly above the spider arrangement. Above the diffuser plate are several strata of filter medium supporting gravel or other granular material, the strata being arranged so that larger particles are in the lower stratum and the particle size decreases with each higher stratum. The granules of the uppermost stratum of the supporting material are of substantially the same size as those of the filter medium which is placed thereon. The major purpose of the supporting layers is to adequately diffuse the backwash fluid during regeneration.

This arrangement has obvious inherent disadvantages, among which are the excess space consumed by the filter bed supporting medium and the complications involved in removing the spider assembly and diffuser plate for routine maintenance. Such tanks also must include manholes and bolted covers, which add appreciably to fabrication costs.

Through the use of my improved tank these disadvantages may be eliminated as may be seen from the following description.

Referring to the drawings, FIGURE 2 shows a liquid filtration tank 2, illustrated as a cylindrical tank in a horizontal position, but which may be of any shape and orientation. Projecting into tank 2 is an influent tube 4 having a cap 6 at the inner end thereof and having perforations 8 spaced along its length, this pipe has a flange 10 mounted thereabout at a portion which remains outside the tank. The flange 10 mates with flange 12 which is mounted at the outer end of a short pipe 14 of larger size than tube 4 and which projects through the walls of the tank 2 and is permanently attached thereto as by welding. The flanges 10 and 12 serve as fluid conduit coupling members. The influent tube 4 placed within the tank by passing it through pipe 14 and bolting together the flanges 10 and 12.

The filter bed is generally indicated at 16 and may be made of generally uniform granules of fine sand, anthracite coal, graphite, plastic resin, or other filter media. It fills the tank to a given level which, as shown, may be about one-half the vertical dimension of the tank. If supporting stratum may be used beneath the bed of filter desired a filter supporting stratum may be used beneath the bed of filter medium. For purposes of this description, such a supporting stratum will be considered a portion of the filter bed.

Within the filter bed 16 and in the lower portion thereof is located an effluent member 18 comprising a capped tube 20 with perforations 22 therein, and a sleeve 24 made of flexible mesh or cloth and mounted about the tube. This flexible sleeve is of a materially greater diameter than the tube and is secured to the tube 20 at its extremities by removable clamps 26 of any suitable design. The sleeve material is selected for the particular use of the filtration tank and the chemical nature of the filter bed. It may be made of nylon, stainless steel wire cloth, bronze cloth, cotton or woolen fabrics, or any other suitable material. The mesh size will, of course, be governed by the particle size of the surrounding medium and will not allow passage of the filter medium into the effluent tube.

The effluent member 18 is mounted in the filtration tank in a manner similar to the mounting of tube 4, as by bolting flanges 28 and 30, flange 30 being secured to tank mounted pipe 32. It will be noted that pipe 32 must be of sufficient size to allow for the passage of effluent tube 20 with the sleeve 24 mounted thereabout which of course would be in collapsed condition when inserted or removed. The tubes 4 and 20 may be mounted in any conventional manner but the disclosed arrangement is preferred since it provides for reasonably simple insertion and removal of the tubes for any maintenance that may become necessary.

During normal filtering operation of the tank the fluid to be filtered will pass from the perforations 8 in tube 4 into the tank 2. After passing through the filter bed 16, the fluid is drawn through sleeve 24 into the perforations 22 located in tube 20 and thence to the outside of the tank. When this normal filtering operation is taking place the flexible sleeve 24 will collapse under the weight of the filter medium and the fluid pressure so that it will conform generally to the shape of the effluent tube 20 as shown in FIGURE 4. The mesh material of sleeve 24 is of a selected size so that it will prevent the passage of granules of the filter medium into effluent tube 20.

When the filter medium is regenerated by applying regenerative fluid under pressure to effluent tube 20, the flexible sleeve 24 inflates to the position shown in FIGURES 2 and 3 where it is spaced substantial distance from tube 20. It will be noted that the sleeve 24, when inflated, remains entirely below the given level to which the tank is filled with particulate material. The initial inflation will cause the filter bed to break up as shown in FIGURE 2, thus providing mechanical agitation to the bed at the outset of regeneration and/or backwashing. Thereafter, the mesh material of sleeve 24 will effectively diffue the backwash fluid throughout the filter bed. This diffusion will prevent channeling and short circuiting of the backwash fluid and is efficient enough to eliminate the multi-layered filter bed supporting medium known in the prior art.

Having thus described my invention it is understood that the inventive concept herein is not necessarily limited to only the embodiment shown but it may take many forms which are outlined by the claims appended hereto.

I claim:

1. In a filtration tank having backwash regeneration, a filter bed of particulate matter gravitationally supported within said tank and filling said tank to a given level, means distributing influent to within said tank, an effluent receiver within said bed and beneath said given level having fluid connections to the outside of said tank, a flexible foraminous member covering all portions of said effluent receiver which are in fluid communication with said bed, said flexible foraminous member having a surface area materially greater than the surface area of said effluent receiver which it covers to permit substantial spacing between portions of said flexible foraminous member and said effluent receiver, means for applying regenerative fluid under pressure within said effluent receiver during regeneration to cause portions of said flexible foraminous member to inflate and flex away from said effluent receiver to mechanically disturb said filter bed and diffuse regenerative fluid through said bed without channeling, said flexible foraminous member being located entirely beneath said given level when it is so inflated.

2. In a filtration tank having backwash regeneration, a filter bed of particulate matter gravitationally supported within said tank and filling said tank to a given level, means distributing influent to within said tank, a perforated tubular effluent receiver closed at one end and located within said bed and beneath said given level having fluid connections to the outside of said tank, a sleeve of flexible foraminous material covering all portions of said effluent receiver in fluid communication with said filter bed, said sleeve having materially greater transverse dimensions than said effluent receiver to permit substantial spacing between portions of said sleeve and said effluent receiver, means for applying regenerative fluid under pressure within said effluent receiver during regeneration to cause portions of said sleeve to inflate and flex away from said effluent receiver to mechanically disturb said filter bed and diffuse the regenerative fluid through said bed without channeling, said sleeve being located entirely beneath said given level when it is so inflated.

3. In a filtration tank having backwash regeneration, a filter bed of particulate matter gravitationally supported within said tank and filling said tank to a given level, means distributing influent to within said tank, a perforated tubular effluent receiver located within said bed and beneath said given level having fluid connections to the outside of said tank, a sleeve of flexible foraminous material surrounding the perforated portions of said effluent receiver so that all fluid passing between said filter bed and said effluent receiver must pass through said sleeve, said sleeve having materially greater transverse dimensions than said effluent receiver to permit substantial spacing between portions of said sleeve and said effluent receiver, means for applying regenerative fluid under pressure within said effluent receiver during regeneration to cause portions of said sleeve to inflate and flex away from said effluent receiver to mechanically disturb said filter bed and diffuse regenerative fluid through said bed without channeling, said sleeve being located entirely beneath said given level when it is so inflated.

4. A liquid filtration tank having backwash regeneration comprising, a horizontally oriented cylinder having a longitudinal axis and closed ends, a tube holding pipe passing through one of said closed ends and oriented parallel to said tank axis, fluid conduit coupling means affixed to the outer end of said tube holding pipe, a removable perforated tube member passing into said tank through said tube holding pipe and having a fluid conduit coupling mounted near the outer end thereof which engages said fluid conduit coupling on said tube holding pipe, a filter bed of particulate matter gravitationally supported within said tank and filling said tank to a given level above said perforated tube, a sleeve of flexible foraminous material surrounding the perforated portions of said perforated tube so that all fluid passing between said filter bed and said perforated tube must pass through said sleeve, said sleeve having transverse dimensions materially greater than those of said perforated tube to permit substantial spacing between portions of said sleeve and said perforated tube, means for applying the regenerative fluid under pressure within said perforated tube during regeneration to cause portions of said sleeve to inflate and flex away from said perforated tube to mechanically disturb said filter bed and diffuse regenerative fluid through said bed without channeling, said sleeve being located entirely beneath said given level when it is so inflated.

References Cited by the Examiner

UNITED STATES PATENTS

| | | | |
|---|---|---|---|
| 1,788,510 | 1/1931 | Everson | 210—289 |
| 1,958,176 | 5/1934 | Zimmerman | 210—288 X |
| 2,063,086 | 12/1936 | Fitzgerald | 210—288 X |
| 2,064,097 | 12/1936 | White | 210—289 X |
| 2,170,180 | 8/1939 | Youker | 210—289 X |
| 2,221,210 | 11/1940 | Soderquist | 210—356 X |
| 2,732,948 | 1/1956 | Koupal et al. | 210—356 X |
| 2,789,696 | 4/1957 | Jahnig et al. | 210—279 X |
| 2,921,774 | 1/1960 | Glasgow et al. | 55—175 X |
| 3,009,537 | 11/1960 | Glasgow et al. | 55—174 X |
| 3,011,643 | 12/1961 | McCoy | 210—289 X |
| 3,019,184 | 1/1962 | Brown | 210—408 X |
| 3,100,190 | 8/1963 | Hobson | 210—356 X |

REUBEN FRIEDMAN, *Primary Examiner.*

D. M. RIESS, *Assistant Examiner.*